US010303884B2

(12) United States Patent
Liu et al.

(10) Patent No.: US 10,303,884 B2
(45) Date of Patent: May 28, 2019

(54) COUNTERSIGNING UPDATES FOR MULTI-CHIP DEVICES

(71) Applicant: Apple Inc., Cupertino, CA (US)

(72) Inventors: Peng Liu, San Jose, CA (US); Ahmer A. Khan, Milpitas, CA (US); Onur E. Tackin, Saratoga, CA (US); Oren M. Elrad, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 194 days.

(21) Appl. No.: 15/588,547

(22) Filed: May 5, 2017

(65) Prior Publication Data

US 2018/0082065 A1 Mar. 22, 2018

Related U.S. Application Data

(60) Provisional application No. 62/398,458, filed on Sep. 22, 2016.

(51) Int. Cl.

| | |
|---|---|
| ***G06F 1/00*** | (2006.01) |
| ***G06F 21/57*** | (2013.01) |
| ***H04L 9/32*** | (2006.01) |
| ***H04L 29/06*** | (2006.01) |

(52) U.S. Cl.

CPC .......... *G06F 21/572* (2013.01); *H04L 9/3247* (2013.01); *H04L 63/123* (2013.01); *H04L 63/0823* (2013.01)

(58) Field of Classification Search

CPC ... G06F 21/572; H04L 9/3247; H04L 63/123; H04L 63/0823

USPC .... 717/170, 173; 713/176, 164, 2, 156, 193; 726/3, 4

See application file for complete search history.

(56) References Cited

U.S. PATENT DOCUMENTS

| | | | | |
|---|---|---|---|---|
| 6,546,492 B1 * | 4/2003 | Walker | G06F 8/65 726/3 |
| 7,594,107 B1 * | 9/2009 | Parkhill | G06F 8/65 713/156 |
| 8,745,612 B1 * | 6/2014 | Semenzato | G06F 8/65 717/170 |
| 2007/0192611 A1 * | 8/2007 | Datta | G06F 21/57 713/176 |
| 2008/0168435 A1 * | 7/2008 | Tupman | G06F 8/65 717/173 |

(Continued)

*Primary Examiner* — Aurel Prifti

(74) *Attorney, Agent, or Firm* — Morgan, Lewis & Bockius LLP

(57) ABSTRACT

A device facilitating countersigning updates for multi-chip devices includes at least one processor configured to receive, from a collocated chip, a data item and a software update, the data item being signed using a private key corresponding to a primary entity associated with the collocated chip and the data item comprising an authentication code generated using a symmetric key corresponding to a secondary entity associated with the software update. At least one processor is further configured to verify the data item using a public key associated with the primary entity. At least one processor is further configured to verify the software update based at least in part on the authentication code and using the symmetric key corresponding to the primary entity. At least one processor is further configured to install the software update when both the data item and the software update are verified, otherwise discard the software update.

20 Claims, 12 Drawing Sheets

(56) References Cited

U.S. PATENT DOCUMENTS

| | | | | | |
|---|---|---|---|---|---|
| 2009/0222674 | A1* | 9/2009 | Leichsenring | G06F 21/51 | 713/193 |
| 2011/0004895 | A1* | 1/2011 | Ladd | H04N 21/43615 | 725/31 |
| 2011/0131403 | A1* | 6/2011 | Ibrahim | G06F 21/572 | 713/2 |
| 2011/0258426 | A1* | 10/2011 | Mujtaba | G06F 21/57 | 713/2 |
| 2015/0074764 | A1* | 3/2015 | Stern | H04L 63/06 | 726/4 |
| 2015/0121070 | A1* | 4/2015 | Lau | G06F 8/654 | 713/164 |
| 2016/0147996 | A1* | 5/2016 | Martinez | G06F 21/572 | 713/2 |
| 2017/0099148 | A1* | 4/2017 | Ochmanski | H04L 9/3247 | |

* cited by examiner

900

COMMANDS TABLE

| NAME | CLS | INS | P1 | P2 | LC | DATA | COMMENTS |
|---|---|---|---|---|---|---|---|
| MANIFESTQUERY_C | 0×CE | 0×F0 | 0×F1 | 0×00 | 0×00 | | |
| MANIFESTDATA_C | 0×CE | 0×F0 | 0×F2 | 0×00 OR 0×01 | LENGTH OF DATA | CHUNKS OF MANIFEST | P2 INDICATE "MORE DATA AVAILABLE"<br>0×00: LAST CHUNK OF MANIFEST<br>0×01: MORE MANIFEST DATA |
| IMAGEDOWNLOAD_C | 0×CE | 0×F0 | 0×F0 | 0×00 | LENGTH OF DATA | CHUNKS OF DOWNLOAD PACKET | |

MANIFEST QUERY RESPONSE (MANIFESTQUERY_R)

| | FIELD | COMMENTS |
|---|---|---|
| 1002 | PROTOCOL VERSION | TWO BYTES. BYTE[0]=MAJOR NUMBER. BYTE[1]=MINOR NUMBER; CURRENT PROTOCOL VERSION IS 1.1 |
| 1004 | IMAGE TYPE | ONE BYTE. 0 FOR BL; 1 FOR BLP; 2 FOR OS; 3 FOR MOS; 4 FOR FW. OTHER VALUES ARE RESERVED |
| 1006 | CONFIGURATION FLAG | ONE BYTE. 0 FOR DEV; 1 FOR PRODUCTION. OTHER VALUE ARE RESERVED |
| 1008 | SEID | 24 BYTES OF SEID |
| 1010 | DEVICE NONCE | 20 BYTES OF NONCE |
| 1012 | ROOT PUBLIC KEY IDENTIFIER | 32 BYTES. THE SHA256(OCTET STRING ENCODED X COORDINATE II Y COORDINATE OF ROOT PUBLIC KEY) |
| 1014 | FW IMAGE KEY IDENTIFIER | 32 BYTES OF MAGIC TO IDENTIFY FW IMAGE KEYS |
| 1016 | OS IMAGE KEY IDENTIFIER | 32 BYTES OF MAGIC TO IDENTIFY OS IMAGE KEYS |
| 1018 | BL VERSION | SAME FORMAT AS PROTOCOL VERSION |
| 1020 | FW VERSION | SAME FORMAT AS PROTOCOL VERSION |
| 1022 | OS VERSION | SAME FORMAT AS PROTOCOL VERSION |
| 1024 | MOS VERSION | SAME FORMAT AS PROTOCOL VERSION |
| 1026 | DATA FORMAT VERSION | ONE BYTE, PROVIDED BY OS (22559003) |
| 1028 | CHIP ID | 4 BYTES. CHIP ID IN LITTLE ENDIAN |
| 1030 | SW1+SW2 | 0x90 0x00' FOR SUCCESS, OTHERWISE ERROR CODE |

*FIG. 10*

COUNTERSIGNING UPDATES FOR MULTI-CHIP DEVICES

CROSS-REFERENCE TO RELATED APPLICATIONS

The present application claims the benefit of U.S. Provisional Patent Application Ser. No. 62/398,458, entitled "Countersigning Updates for Multi-Chip Devices," filed on Sep. 22, 2016, which is hereby incorporated by reference in its entirety for all purposes.

TECHNICAL FIELD

The present description relates generally to updates for multi-chip devices, including countersigning updates for multi-chip devices.

BACKGROUND

In an electronic device that includes multiple interfacing chips, such as a mobile phone, a security vulnerability in any one of the chips could compromise the security of the entire device. For example, in a device that includes a primary chip, such as an application processor, and a secondary (or supplemental) chip, such as a secure element, a security vulnerability in, for example, an update to the software (e.g., firmware and/or operating system (OS)) of the secondary chip, could compromise the security of the entire device irrespective of the strength of the security implemented by the primary chip.

BRIEF DESCRIPTION OF THE DRAWINGS

Certain features of the subject technology are set forth in the appended claims. However, for purpose of explanation, several embodiments of the subject technology are set forth in the following figures.

FIG. 9 illustrates an example commands table in a system for countersigning updates for multi-chip devices in accordance with one or more implementations.

FIG. 10 illustrates an example manifest query response message format in a system for countersigning updates for multi-chip devices in accordance with one or more implementations.

DETAILED DESCRIPTION

Figure 1:
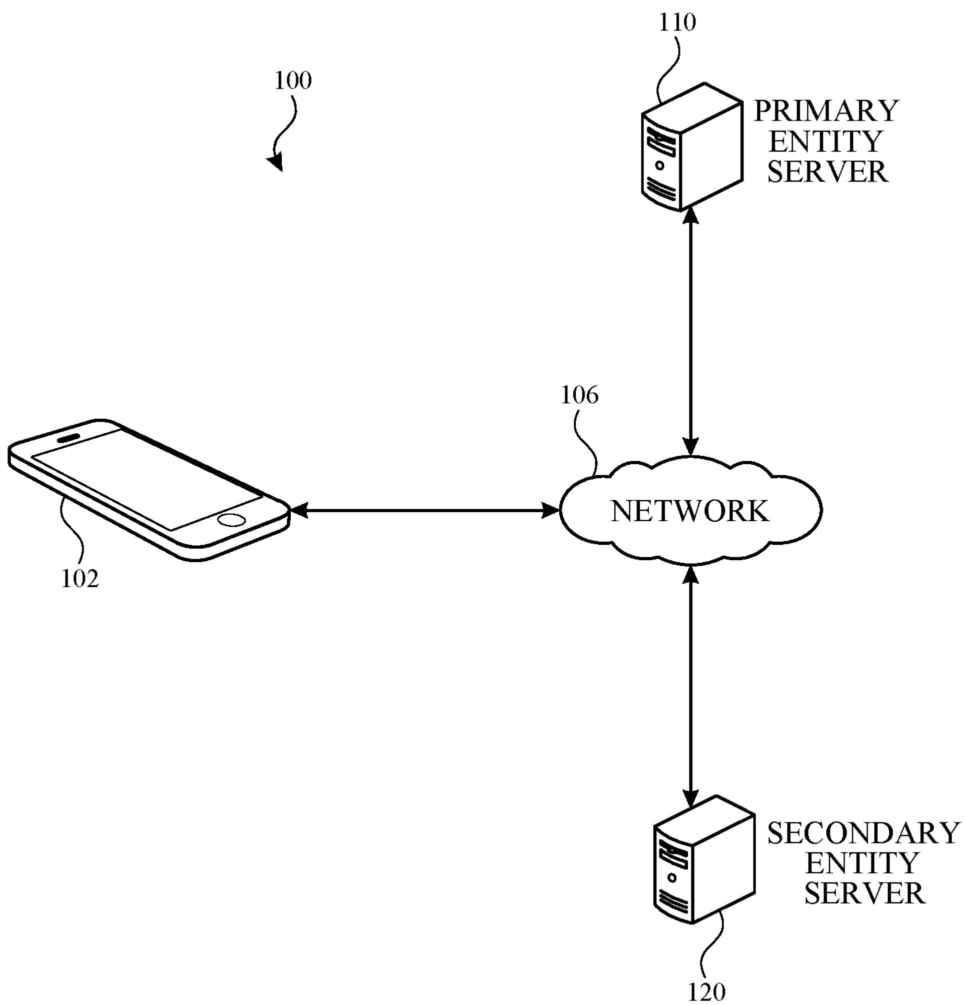
FIG. 1 illustrates an example network environment for countersigning updates for multi-chip devices in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A manufacturer of a multi-chip electronic device and/or the manufacturer of the software (e.g., firmware and/or OS) of a primary chip of a multi-chip device, may wish to control updates made to the software (e.g., firmware and/or OS) of one or more secondary chips of the multi-chip device, e.g., to ensure that the updates do not compromise the security of the entire device and/or to ensure that the updates do not impair the secondary chip's interactions with the primary chip.

The subject system allows a primary entity, such as a manufacturer of a multi-chip electronic device and/or a manufacturer associated with the software of a primary chip of a multi-chip device, to countersign, in addition to a secondary entity, such as the manufacturer of a secondary chip of a multi-chip device, updates to the software of the secondary chip. The secondary entity may provide a software update for the secondary chip to the primary entity, along with an authentication code for the update generated using a symmetric key corresponding to the secondary entity. The primary entity may inspect, test, or otherwise review the update for the secondary chip, e.g., to ensure that the update does not compromise the security of the device and/or impair interactions with or compromise the security of the primary chip. Upon approving the update, the primary entity may generate a manifest data item that includes, e.g., the authentication code for the update, and the primary entity may sign the manifest data item using a private key corresponding to the primary entity. The primary entity may provide the update with the signed data item responsive to a request for a software update from a multi-chip electronic device.

In a secondary chip, such as a secure element, implementing the subject system, a process to update the software of the secondary chip may fail when the software update is not transmitted with a manifest data item that can be verified as being signed by the primary entity and/or when the software update cannot be verified against an authentication code included in the manifest data item. Thus, the secondary chip may be preconfigured with a public key associated with the primary entity as well as the symmetric key associated with the secondary entity, such that the secondary chip can both verify the signed manifest data item and verify the software update against the authentication code included in the manifest data item. In this manner, the primary entity is able to control the software updates to the secondary chip, while still allowing the updates to be signed by the secondary entity.

FIG. 1 illustrates an example network environment 100 for countersigning updates for multi-chip devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, a primary entity server 110 and a secondary entity server 120. The network 106 may communicatively (directly or indirectly) couple, for example, any two or more of the electronic device 102, the primary entity server 110, and/or the secondary entity server 120. In one or more implementations, the network 106 may be an interconnected network of devices that may include, or may be communicatively coupled to, the Internet. For explanatory purposes, the network environment 100 is illustrated in FIG. 1 as including a single electronic device 102, a single primary entity server 110, and a single secondary entity server 120; however, the network environment 100 may include any number of electronic devices and any number of primary and/or secondary entity servers that are respectively associated with any number of distinct primary and/or secondary entities.

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a mobile device. The electronic device 102 may be, and/or may include all or part of, the electronic device discussed below with respect to FIG. 2, and/or the electronic system discussed below with respect to FIG. 11.

In one or more implementations, the electronic device 102 may include multiple chips, such as a host processor, which may be the primary chip of the electronic device 102, and a secure element, which may be a secondary chip of the electronic device 102. An example electronic device that includes a host processor and a secure element is discussed further below with respect to FIG. 2. In one or more implementations, the electronic device 102 may include additional secondary chips, such as one or more network interface controller chips, sensor chips, location chips, wireless network chips, processors, or generally any chips of the electronic device 102 other than the primary chip.

The primary entity server 110 may include one or more servers that facilitate providing one or more software updates for a primary chip, such as a host processor, to the electronic device 102. The software updates for the primary chip may include, for example, one or more bootloader updates, OS updates, firmware updates, migration OS updates, and the like. The secondary entity server 120 may include one or more servers that facilitate providing one or more software updates for a secondary chip, such as a secure element, to the electronic device 102. The software updates for the secondary chip may include, for example, one or more bootloader updates, OS updates, firmware updates, migration OS updates, and the like. In one or more implementations, one or more of the bootloader updates, OS updates, firmware updates, and/or migration OS updates may be provided by another secondary entity server associated with another secondary entity. For example, a first secondary entity server may provide OS and migration OS updates and a second secondary entity server may provide firmware and bootloader updates. The primary entity server 110 and/or the secondary entity server 120 may be, and/or may include all or part of, the electronic system discussed below with respect to FIG. 11.

In the subject system, the secondary entity server 120 may provide a software update for the secondary chip to the primary entity server 110. The secondary entity server 120 may also provide an authentication code for the update to the primary entity server 110. The authentication code may be generated by the secondary entity server 120 using a secret or symmetric key corresponding to and/or associated with the secondary entity server 120. The primary entity server 110 may test and/or review the software update for approval, e.g., to confirm that the software update will not compromise the security of the electronic device 102 and/or will not otherwise negatively impact the functioning of the electronic device 102.

After determining that the software update can be approved, responsive to a request for the software update, such as from the electronic device 102, the primary entity server 110 generates a manifest data item that includes the authentication code for the update and the primary entity server 110 signs the manifest data item using a private key corresponding to the primary entity server 110. An example manifest data item is discussed further below with respect to FIG. 3. The primary entity server 110 may subsequently provide the update and the signed manifest data item to the electronic device 102. An example process of the primary entity server 110 in the subject system is discussed further below with respect to FIG. 5.

The secondary chip of the electronic device 102, such as the secure element, may receive the software update and the signed manifest data item from the primary entity server 110 via the primary chip of the electronic device 102, such as the host processor. Example processes of the secondary chip receiving the manifest data item and/or updates from the primary chip are discussed further below with respect to FIGS. 6-8. The secondary chip may verify, using a public key associated with the primary entity server 110, the digital signature of the signed manifest data item. The secondary chip may also verify the software update based at least on the authentication code included in the manifest data item and using a symmetric key associated with the secondary entity. If the secondary chip is able to properly verify the digital signature of the manifest data item and the software update, the secondary chip installs the software update. An example process of a secondary chip in the subject system is discussed further below with respect to FIG. 4.

Figure 2:
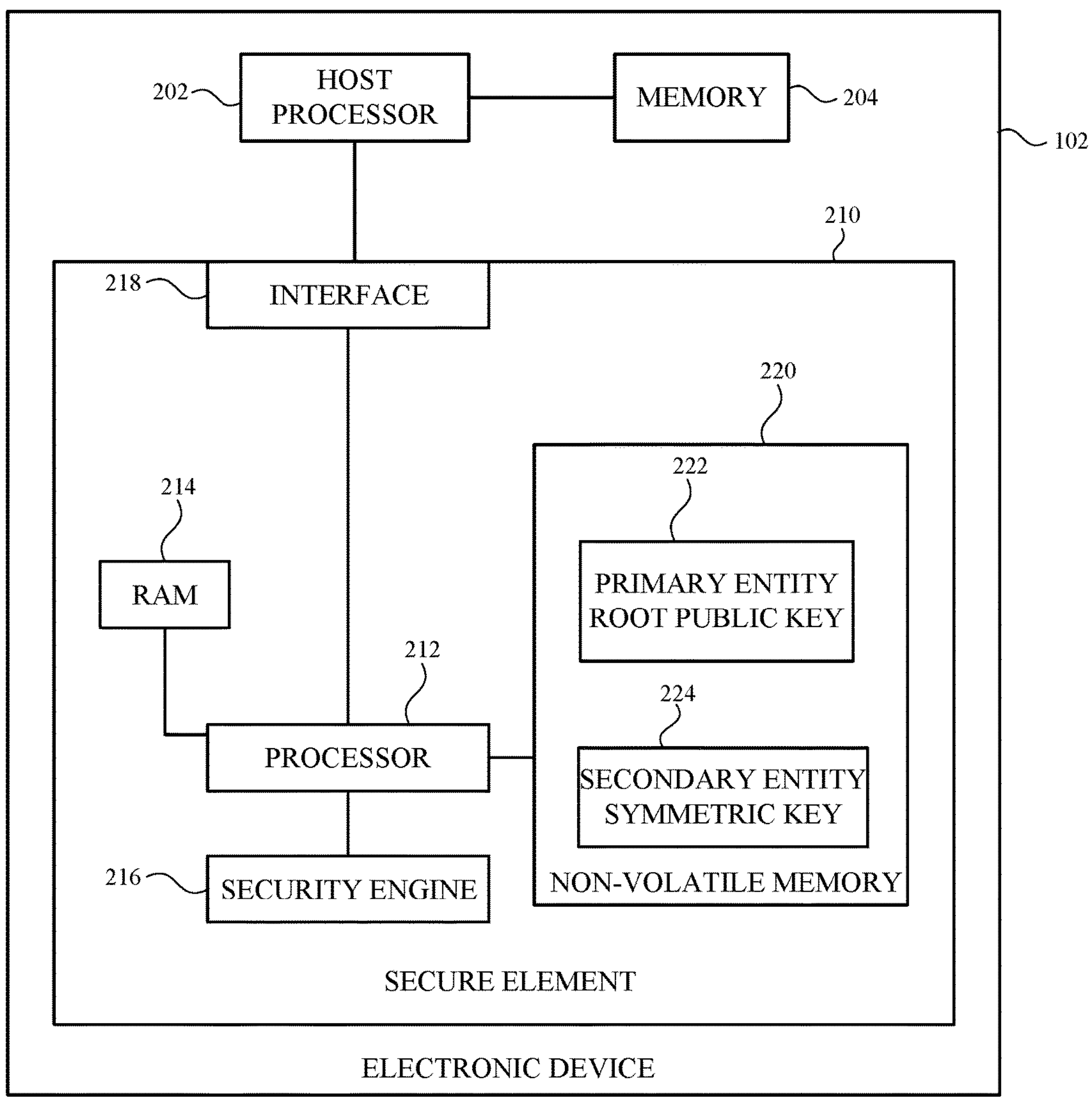
FIG. 2 illustrates an example electronic device including an example secure element that may be used in a system for countersigning updates for multi-chip devices in accordance with one or more implementations.

FIG. 2 illustrates an example electronic device 102 including an example secure element 210 that may be used in a system for countersigning updates for multi-chip devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include, among other components, a host processor 202, a memory 204, and a secure element 210. The secure element 210 may include a secure processor 212, RAM 214, a security engine 216, an interface 218, and non-volatile memory 220. The RAM 214 may include one or more of static RAM (SRAM) and/or dynamic RAM (DRAM). The interface 218 may communicatively couple the secure element 210 to one or more other chips in the electronic device 102, such as the host processor 202 and/or an NFC controller. Thus, the secure element 210 may communicate with the host processor 202 over the interface 218. In one or more implementations, the secure element 210 may communicate with the host processor 202 over the interface 218 and through the NFC controller. The interface 218 may be, for example, a single wire protocol (SWP) interface, a universal serial bus (USB) interface, a universal asynchronous receiver/transmitter interface (UART), or generally any data interface.

The secure processor 212 may be, for example, a reduced instruction set computing (RISC) processor, an advanced RISC machine (ARM) processor, or generally any processing circuitry. In one or more implementations, the operating system and/or execution environment running on the secure processor 212 may be a JAVA-based operating system and/or JAVA-based execution environment. In other implementations, other operating systems, languages, and/or environments can be implemented.

The non-volatile memory 220 may be and/or may include, for example, flash memory. The non-volatile memory 220 may store a primary entity root public key 222 and/or a secondary entity symmetric key 224. In one or more implementations, the primary entity root public key 222 and/or the secondary entity symmetric key may be stored in the non-volatile memory 220 when the secure element 210 is manufactured, such as by the secondary entity. The non-volatile memory 220 may also store one or more identifiers and/or other values, such as a secure element identifier, a chip identifier, and the like. The secure element identifier may be an immutable identifier that uniquely identifies the secure element 210 relative to any other secure elements in communication with the primary entity server 110. The chip identifier may be an identifier of the hardware of the secure element 210 and may be unique across different generations of secure elements. One or more of the identifiers may also be stored in the non-volatile memory 220 when the secure element 210 is manufactured.

In one or more implementations, the non-volatile memory 220 may also store firmware and/or operating system executable code that is executed by the secure processor 212 to provide an execution environment, such as the JAVA execution environment. In one or more implementations, the firmware stored in the non-volatile memory 220 serves as a library of code for the operating system running on the secure processor 212.

The security engine 216 may perform one or more security operations for the secure element 210. For example, the security engine 216 may perform cryptographic operations and/or may manage cryptographic keys and/or certificates, such as the primary entity root public key 222 and/or the secondary entity symmetric key 224.

The host processor 202, which may also be referred to as an application processor, may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In some implementations, the host processor 202 may be referred to as the primary chip in the electronic device 102 and the secure element 210 may be referred to as the secondary chip in the electronic device 102. In some other implementations, the host processor 202 may be referred to as the secondary chip in the electronic device 102 and the secure element 210 may be referred to as the primary chip in the electronic device 102. The primary entity server 110 may provide, to the host processor 202, software updates for the primary chip, e.g., the host processor 202, as well as software updates for the secondary chip, e.g. the secure element 210. The host processor 202 may transmit, to the secure element 210, the software updates for the secure element 210, such as over the interface 218.

In one or more implementations, one or more of the host processor 202, the memory 204, the secure element 210, the secure processor 212, the RAM 214, the security engine 216, the interface 218, the non-volatile memory 220, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 3:
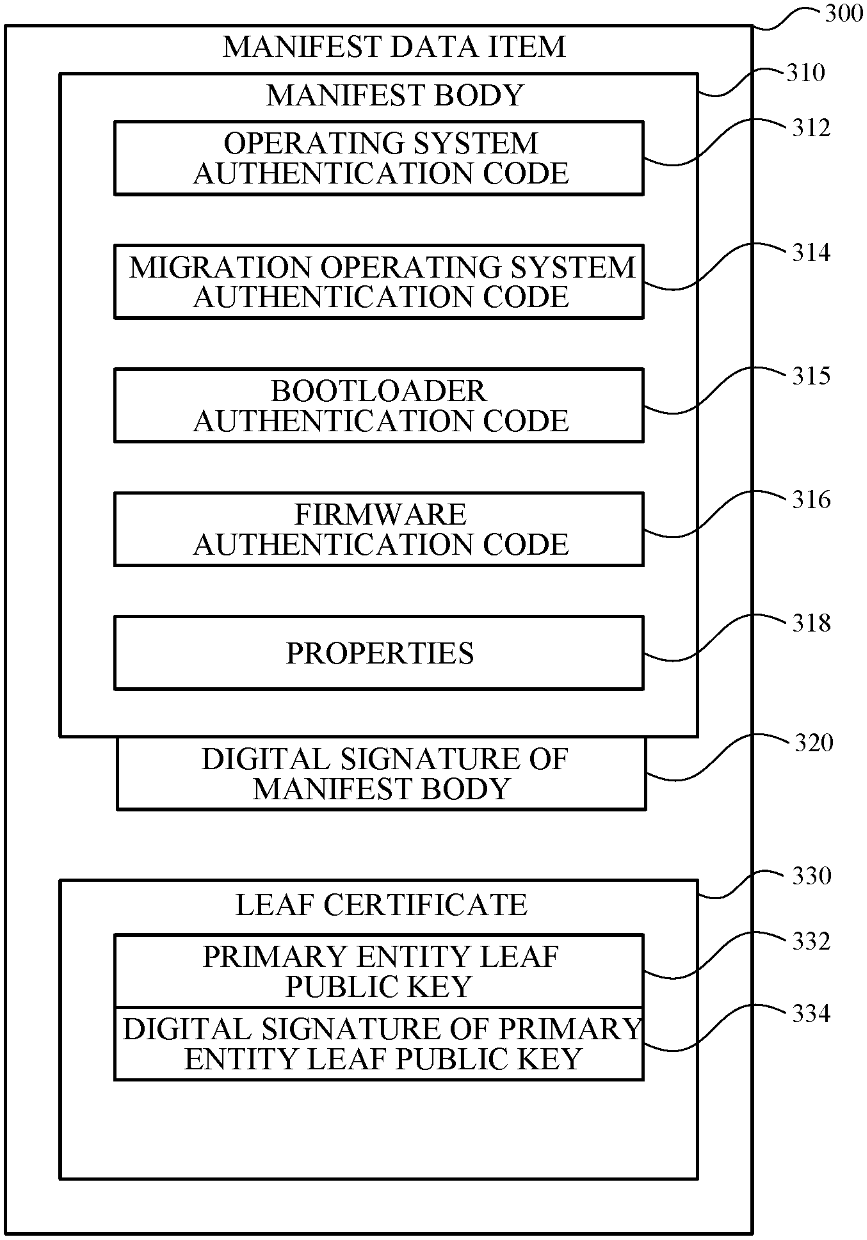
FIG. 3 illustrates an example manifest data item in a system for countersigning updates for multi-chip devices in accordance with one or more implementations.

FIG. 3 illustrates an example manifest data item 300 in a system for countersigning updates for multi-chip devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The manifest data item 300 may be generated by the primary entity server 110 in conjunction with providing one or more software updates for the secondary chip, such as the secure element 210, to the electronic device 102. The manifest data item 300 includes a manifest body 310, a digital signature 320 of the manifest body 310, and a leaf certificate 330. The manifest body 310 includes an authentication code corresponding to each software update being provided with the manifest data item 300. Thus, the manifest body 310 may include one or more of an operating system authentication code 312, a migration operating system authentication code 314, a bootloader authentication code 315, and/or a firmware authentication code 316. In some implementations, one or more of the authentication codes 312, 314, 315, and 316 may have a predetermined length, such as 16 bytes. In other implementations, one or more of the authentication codes 312, 314, 315, and 316 may be any (fixed or variable) length.

In one or more implementations, one or more of the authentication codes 312, 314, 315, and 316 may be generated by respective secondary entity servers (that are providing the corresponding software updates) using their respective symmetric keys. For example, the secondary entity server 120 may provide an operating system update to the primary entity server 110 along with the operating system authentication code 312. The operating system authentication code may be generated by the secondary entity server 120 by applying, for example, a block cipher-based message authentication code algorithm to the bits of the operating system update and/or a hash of all or part of the operating system update using a secret key, or symmetric key. In one or more implementations, the secondary entity server 120 may utilize a Cipher-based Message Authentication Code (CMAC) algorithm to generate the authentication code from the operating system update or a hash thereof using a secret or symmetric key. In one or more implementations, the cipher used by the secondary entity server 120 may be an Advanced Encryption Standard (AES), such as an AES-128 cipher.

In one or more implementations, if the secondary chip of the electronic device 102 utilizes multiple different versions of the software updates, such as a development version and a production version, the manifest body 310 of the manifest data item 300 may include separate authentication codes for the different versions of the software updates, such as a production operating system authentication code and a development operating system authentication code. The primary entity server 110 may sign the manifest body 310 of the manifest data item 300, e.g., by signing a hash of the manifest body 310 using a private key, to generate the digital signature 320 of the manifest body 310. The digital signature 320 of the manifest body 310 may be added to the manifest data item 300. In one or more implementations, the hash may be generated using a secure hash algorithm (SHA)-256 and the public key cryptography, e.g., the digital signature 320, may utilize Elliptic Curve Digital Signature Algorithm (ECDSA) (National Institute of Standards and Technology (NIST) P-256).

In one or more implementations, the primary entity server 110 may sign the manifest body 310 of the manifest data item 300 using the private key for which the corresponding public key is stored on the secure element 210 of the electronic device 102. In these implementations, the manifest data item 300 may not include the leaf certificate 330. However, in one or more implementations, the primary entity server 110 may sign the manifest body 310 of the manifest data item 300 using a primary entity leaf private key for which the corresponding primary entity leaf public key 332 may not be stored on the secure element 210 of the electronic device 102, but may be included in the leaf certificate 330 of the manifest data item 300.

Furthermore, the primary entity leaf public key 332 of the leaf certificate 330 may be signed, such as by a root primary entity server, using the private key for which the corresponding public key is stored on the secure element 210 of the electronic device 102. The digital signature 334 of the primary entity leaf public key 332 is included in the leaf certificate 330. In this manner, the root primary entity server can reserve the root private key for signing primary entity leaf public keys corresponding to any number of primary entity servers that provide updates to the electronic device 102 without compromising the root private key.

Thus, a secure element 210 receiving the manifest data item 300 depicted in FIG. 3, first verifies the digital signature 334 of the primary entity leaf public key 332 using the primary entity root public key 222, then verifies the digital signature 320 of the manifest body 310 using the primary entity leaf public key 332, and then can individually verify the one or more authentication codes 312, 314, 315, and 316 using the corresponding symmetric keys, such as the secondary entity symmetric key 224.

The manifest data item 300 may further include one or more manifest properties 318. The manifest properties 318 may include one or more properties or constraints that may need to be satisfied by the secondary chip, such as the secure element 210, in order to install the software update. The manifest properties 318 may include, for example, a chip identifier (e.g., a 4-byte integer), a nonce value (e.g., a 20-byte octet string), and/or a secure element identifier (e.g., a 20-byte octet string). The values included in the manifest properties 318 may vary from implementation to implementation. In one or more implementations, the values included in the manifest properties 318 may be indicated in a certificate manifest properties dictionary that may be stored at the primary entity server 110 and/or in the secure element 210.

In one or more implementations, the primary entity may provide a pre-signed generic manifest data item that can be used by the secondary entity during the manufacturing of the secure element 210, e.g., such that the manufacturer of the secure element 210 can install an initial operating system and/or firmware on the secure element. The use of the pre-signed generic manifest data item may be dependent on the accessibility of a one-time programmable (OTP) memory in the secure element 210 and whether the OTP memory is storing a predefined value. Furthermore, the generic manifest data item may include a nonce value and a secure element identifier value that both match predefined values that may be known to the secondary entity. In one or more implementations, the OTP memory may be modified after the pre-signed generic manifest data item is used.

Figure 4:
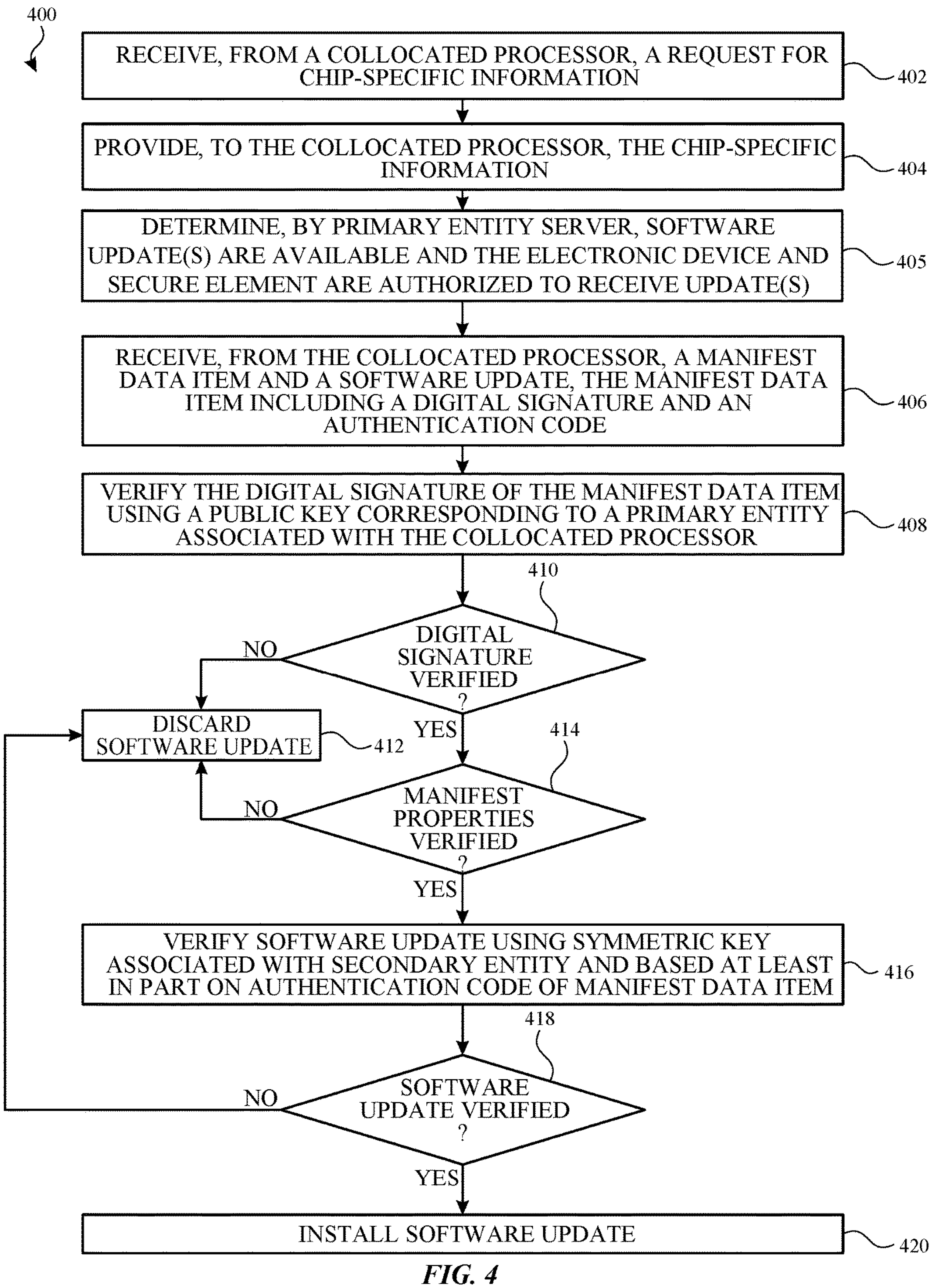
FIG. 4 illustrates a flow diagram of an example process for installing a software update in accordance with one or more implementations.

FIG. 4 illustrates a flow diagram of an example process 400 for installing a software update in accordance with one or more implementations. For explanatory purposes, the process 400 is primarily described herein with reference to the secure element 210 of the electronic device 102 of FIG. 2. However, the process 400 is not limited to the secure element 210 of the electronic device 102 of FIG. 2, and one or more blocks (or operations) of the process 400 may be performed by one or more other components or chips of the electronic device 102 and/or of the secure element 210. The electronic device 102 also is presented as an exemplary device and the operations described herein may be performed by any suitable device. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 may be initiated at the beginning of a software update cycle for a collocated processor, such as the host processor 202 of the electronic device 102, at which time the secondary chip, such as the secure element 210 receives, from the host processor 202 a request for chip-specific information (402). The chip-specific information may include, for example, any/all of a secure identifier, a chip identifier, or the like. The secure element 210 may generate a nonce, such as a pseudorandom number, and may provide the nonce with the chip-specific information as well as store the nonce in the non-volatile memory 220 for later comparison.

The secure element 210 provides the requested chip-specific information to the host processor 202 (404). The secure element 210 may provide the chip-specific information to the host processor 202 in, e.g., a manifest query response message format, such as the manifest query response message format discussed below with respect to FIG. 10. The host processor 202 may then forward the chip-specific information, and/or additional information regarding the operating system running on the host processor 202 to the primary entity server 110. The primary entity server 110 determines whether any updates are available for the secure element 210 and/or whether the electronic device 102 and/or the secure element 210 are authorized to receive updates, e.g., based at least in part on the chip-specific information.

The primary entity server 110 determines that one or more software updates are available and that the electronic device 102 and the secure element 210 are authorized to receive the one or more software updates (405). The primary entity server 110 provides a manifest data item 300 and the one or more software updates to the host processor 202, and the secure element 210 receives, from the host processor 202, the manifest data item 300 followed by the one or more software updates (406). The manifest data item 300 includes a digital signature 320 of the manifest body 310 and one or more authentication codes corresponding to the one or more software updates being provided. The secure element 210 may treat the manifest data item 300 as an attacker controlled entity and may store the manifest data item 300 in the RAM 214 until the manifest data item 300 has been validated and/or verified. The secure element 210 may verify that the manifest data item 300 conforms to a given schema for a manifest data type and that any included version field matches an expected value.

The secure element 210 verifies the digital signature 320 of the manifest body 310 using a public key corresponding to the primary entity associated with the host processor 202, such as the primary entity root public key 222 stored in the non-volatile memory 220 (408). For example, the security engine 216 of the secure element 210 may apply the primary entity root public key 222 to the digital signature of the manifest body 310 and confirm that the output corresponds to the manifest body 310 and/or a hash of the manifest body 310.

If the digital signature 320 of the manifest body 310 cannot be verified using the primary entity root public key 222 (410), the secure element 210 discards the one or more software updates being provided with the manifest data item 300 (412). If the digital signature 320 of the manifest body 310 can be verified using the primary entity root public key 222 (410), the secure element 210 determines whether the manifest properties 318 of the manifest data item 300 can be verified (414). For example, the secure element 210 may compare the values contained in the manifest properties 318 to one or more values stored in the non-volatile memory 220, such as a chip identifier, a secure element identifier, a nonce value, and the like. The nonce value stored on the non-volatile memory 220 may be invalidated after the comparison, e.g., to prevent a replay attack. If one or more of the values stored in the non-volatile memory 220 do not match the values contained in the manifest properties 318 (414), the secure element 210 discards the one or more software updates being provided with the manifest data item 300 (412). In one or more implementations, the secure element 210 may further discard and/or invalidate the manifest data item 300.

If the manifest properties 318 of the manifest data item are satisfied by the values stored in the non-volatile memory 220 of the secure element 210 (414), the secure element 210 verifies each of the one or more received software updates using a symmetric key associated with the corresponding secondary entity, such as the secondary entity symmetric key 224 stored in the non-volatile memory 220, and based at least in part on the authentication code in the manifest data item 300 corresponding to each respective software update, such as the operating system authentication code 312 (416). For example, the security engine 216 of the secure element 210 may locally generate an authentication code from the software update and/or a hash thereof using the secondary entity symmetric key 224 and may compare the locally generated authentication code to the authentication code in the manifest data item 300 that corresponds to the software update, such as the operating system authentication code 312.

If the locally generated authentication code matches the operating system authentication code 312 of the manifest data item 300, then the software update is verified (418), and the secure element 210 installs the software update (420). However, if the locally generated authentication code does not match the operating system authentication code 312 of the manifest data item 300, the software update is not verified (418) and the secure element 210 discards the software update (412) and/or the manifest data item 300.

In one or more implementations, the received manifest data item 300 may include multiple authentication codes that are each associated with a different secondary entity and a different symmetric key. For example, the received manifest data item 300 may include an operating system authentication code 312 associated with a first secondary entity and a first symmetric key, and a bootloader authentication code 315 associated with a second secondary entity and a second symmetric key. Accordingly, the verification of the operating system update based on the operating system authentication code 312 may pass or fail independent of the verification of the bootloader update based on the bootloader authentication code 315. Thus, for example, the secure element 210 may verify the bootloader update based on the bootloader authentication code 315 and using the second symmetric key and install the bootloader update, but the secure element 210 may not be able to verify the operating system update based on the operating system authentication code 312 and using the first symmetric key, and therefore the operating system update may not be installed.

Figure 5:
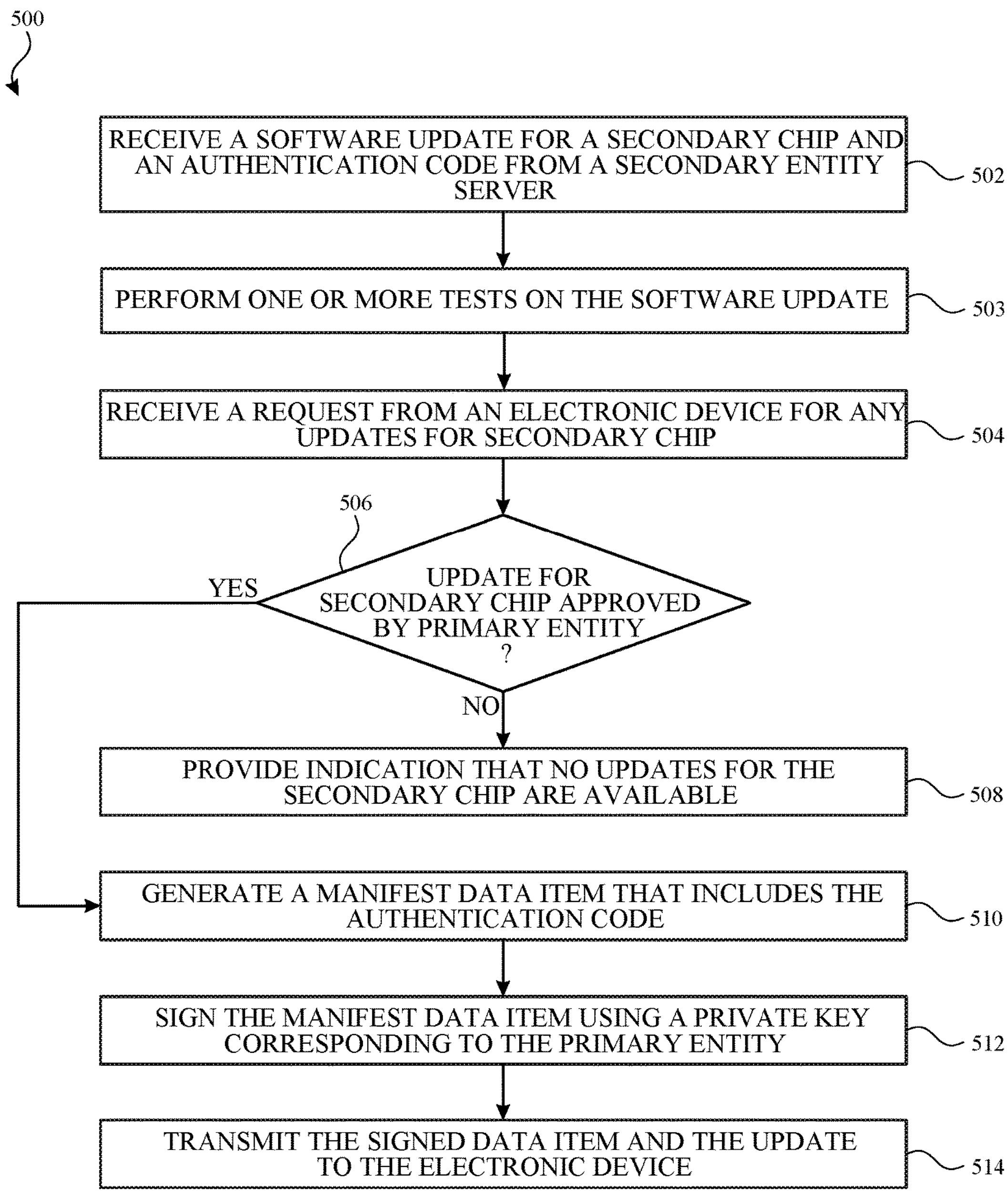
FIG. 5 illustrates a flow diagram of an example process for providing a software update in accordance with one or more implementations.

FIG. 5 illustrates a flow diagram of an example process 500 for providing a software update in accordance with one or more implementations. For explanatory purposes, the process 500 is primarily described herein with reference to the primary entity server 110 of FIG. 1. However, the process 500 is not limited to the primary entity server 110 of FIG. 1, and one or more blocks (or operations) of the process 500 may be performed by one or more other components of the primary entity server 110 and/or by other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The primary entity server 110 receives, from the secondary entity server 120, a software update for a secondary chip of an electronic device 102, such as the secure element 210, along with an authentication code corresponding to the software update (502). In one or more implementations, the secondary entity server 120 may also provide one or more attributes or properties with the software update, such as a nonce value, a current version of the software required to perform the update, a chip identifier associated with the software update and/or different versions of the software update, and the like. In one or more implementations, the primary entity server 110 may not possess the secondary entity symmetric key 224 and therefore may be unable to verify that the received authentication code corresponds to the received software update.

Upon receiving the software update from the secondary entity server 120, the primary entity server may begin performing one or more tests on the software update (503). The tests may be performed, for example, on an emulated version of the secure element 210, e.g., in conjunction with an emulated version of the host processor 202, and/or the tests may include, for example, security tests, stress tests, latency tests, and the like. In one or more implementations, the tests may be automated and/or may be manual. Upon completing the tests, the primary entity server 110 determines whether to approve the software update for the secure element 210.

The primary entity server 110 receives a request from an electronic device 102 for any available updates for the secondary chip, such as the secure element 210 (504). For example, the host processor 202 of the electronic device 102 may transmit one or more identifiers corresponding to the secure element 210 that may identify one or more hardware attributes of the secure element 210, as well as one or more software versions currently installed on the secure element 210, and/or a nonce value. The host processor 202 may further transmit information pertaining to the operating system currently running on the host processor 202.

The primary entity server 110 may determine, based at least in part on the received information, whether the electronic device 102 and/or the secure element 210 is authorized to receive any available updates. For example, if the host processor 202 and/or the secure element 210 are utilizing any unauthorized software, such as an unauthorized bootloader and/or an unauthorized OS, the electronic device 102 may not be authorized to receive any available updates. If the electronic device 102 is authorized to receive an available update, and if the identifier information received for the secure element 210 corresponds to the update for the secondary chip received from the secondary entity server 120, the primary entity server 110 determines whether the update for the secondary chip has been approved by the primary entity (506).

If the update has not been approved (506), and the software for the secure element 210 is otherwise up-to-date, the primary entity server 110 provides an indication to the electronic device 102 that there are no updates currently available for the secondary chip, e.g., secure element 210 (508). If the update has been approved (506), the primary entity server 110 generates a manifest data item that includes the authentication code, as well as one or more manifest properties 318, such as the nonce value, the chip identifier, and/or the secure element identifier initially received from the electronic device 102 (510). The primary entity server 110 signs the manifest data item using a private key corresponding to the primary entity, such as the primary entity root private key (512). The primary entity server 110 then transmits the signed manifest data item 300 and the software update to the electronic device 102 (514).

The host processor 202 of the electronic device 102 may receive the signed manifest data item 300 and the software update and may provide the signed manifest data item 300 and the software update to the secure element 210. Example processes for transmitting the manifest data item 300 and one or more software updates from the host processor 202 to the secure element 210 are discussed further below with respect to FIGS. 6-8.

Figure 6:
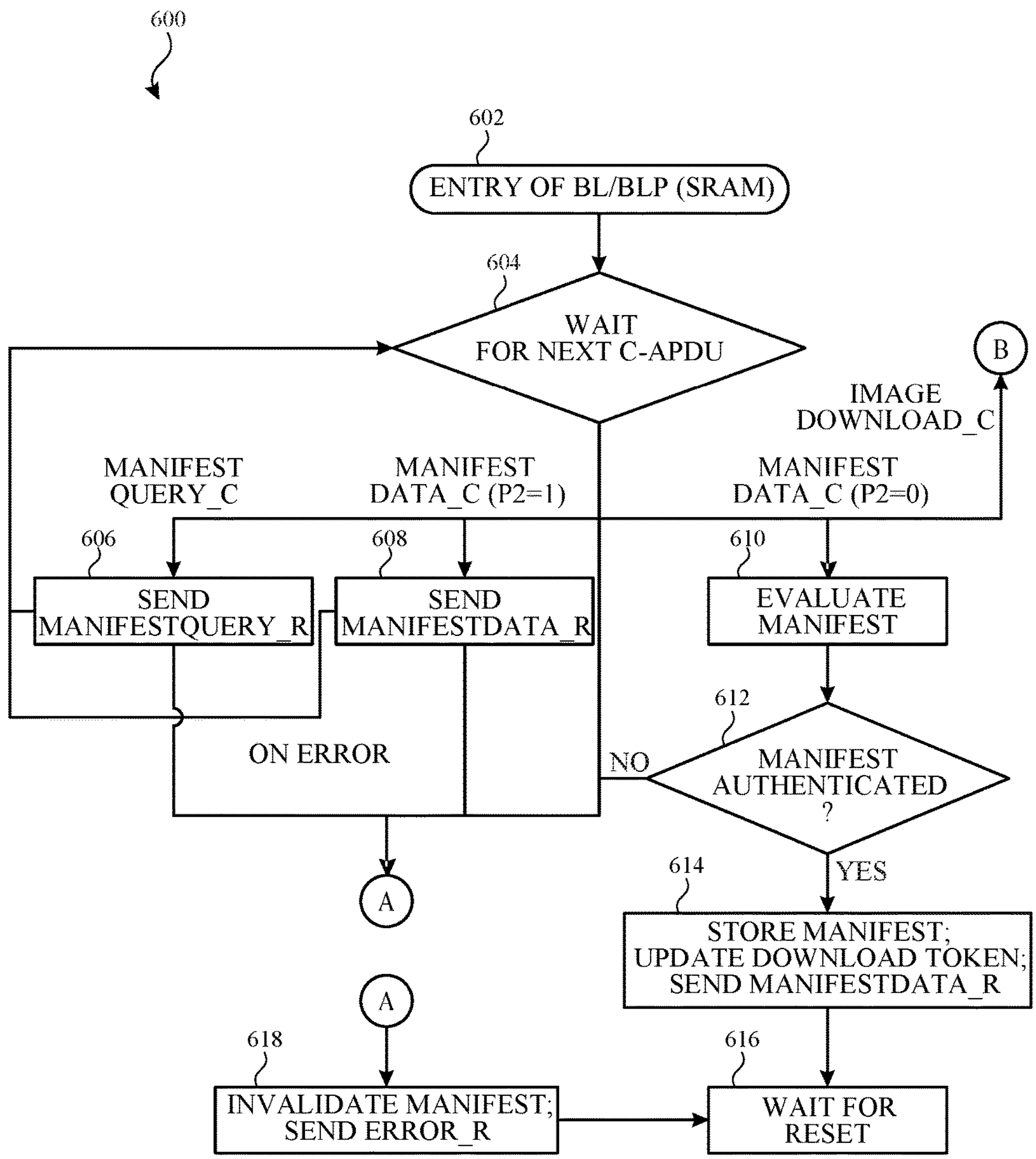
FIG. 6 illustrates a flow diagram of an example process for a secondary chip receiving a manifest data item from a primary chip in accordance with one or more implementations.

FIG. 6 illustrates a flow diagram of an example process 600 for a secondary chip receiving a manifest data item from a primary chip in accordance with one or more implementations. For explanatory purposes, the process 600 is primarily described herein with reference to the secure element 210 of the electronic device 102 of FIG. 2. However, the process 600 is not limited to the secure element 210 of the electronic device 102 of FIG. 2, and one or more blocks (or operations) of the process 600 may be performed by one or more other components or chips of the electronic device 102 and/or of the secure element 210. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The process 600 may be initiated when the secure element 210 enters a bootloader and/or bootloader programmer state (602). The bootloader may be the primary flash bootloader that updates all of the binaries of the secure element 210 with the exception of an update to the bootloader itself. The bootloader programmer may be a temporary bootloader that is used to update the bootloader and may not persist after the bootloader is updated. The secure element 210 waits for a command from the host processor 202, such as a command application protocol data unit (C-APDU) (604). Upon receiving a command, the secure element 210 determines whether the command corresponds to a manifest query command, a manifest data command that includes chunks of the manifest data item 300 and indicates that additional chunks of manifest data item 300 are available, a manifest data command that includes the last chunk of the manifest data item 300, or an image download command. Example commands are discussed further below with respect to FIG. 9.

If the received command corresponds to the image download command, the secure element 210 initiates the process discussed below with respect to FIGS. 7A-7B. If the received command corresponds to a manifest query command, the secure element 210 responds with a manifest query response (606). The manifest query response may include one or more values that identify the secure element 210 and/or the software currently running on the secure element 210. An example manifest query response message format is discussed further below with respect to FIG. 10. If the received command corresponds to a manifest data command that indicates that additional chunks of data are available, the secure element 210 receives the chunks of the manifest data item 300 and sends a manifest data response (608). If the received command corresponds to a manifest data command that includes the last chunk of the manifest data item 300, the secure element 210 combines the received chunks of the manifest data item 300 and evaluates the manifest (610). The secure element 210 determines if the manifest data item 300 can be validated and/or authenticated (612). For example, the secure element 210 may determine whether the format of the manifest data item 300 conforms to a manifest properties dictionary, a manifest body dictionary, and the like. The dictionaries may indicate the acceptable formatting for the various portions of the manifest data item 300.

If the manifest data item 300 can be validated (612), the secure element 210 stores the manifest data item 300, such as in the non-volatile memory 220, updates a download token, and sends a manifest data response (614). The secure element 210 then waits for a reset command (616). In one or more implementations, the download token may indicate whether the secure element 210 is in a download mode or a runtime mode, respectively. The download mode may refer to, for example, an update mode. Thus, the secure element 210 may update the download token (614) to indicate that the secure element 210 is entering a download mode, or the secure element 210 may update the download token (614) to the runtime mode to reflect that the manifest data item 300 was successfully downloaded. If an error occurs with respect to any of the aforementioned operations, the secure element 210 invalidates the manifest data item 300, sends an error response to the host processor 202 (618), and waits for a reset (616).

In one or more implementations, the secure element 210 may support two boot modes, the download mode and a runtime mode. The download mode may be indicated by the download mode token being set to download or the general purpose input output (GPIO) pin set to asserted. In one or more implementations, the GPIO pin may be communicatively coupled to the host processor 202. The runtime mode may be indicated by the download mode token set to runtime and the GPIO pin being de-asserted. In one or more implementations, the GPIO pin may be configured as input after power on reset and assertion of the GPIO pin may indicate that the download mode is being requested by an external chip and/or device, such as the host processor 202. The download mode token may be set to runtime after a successful software update has occurred.

Figure 7A:
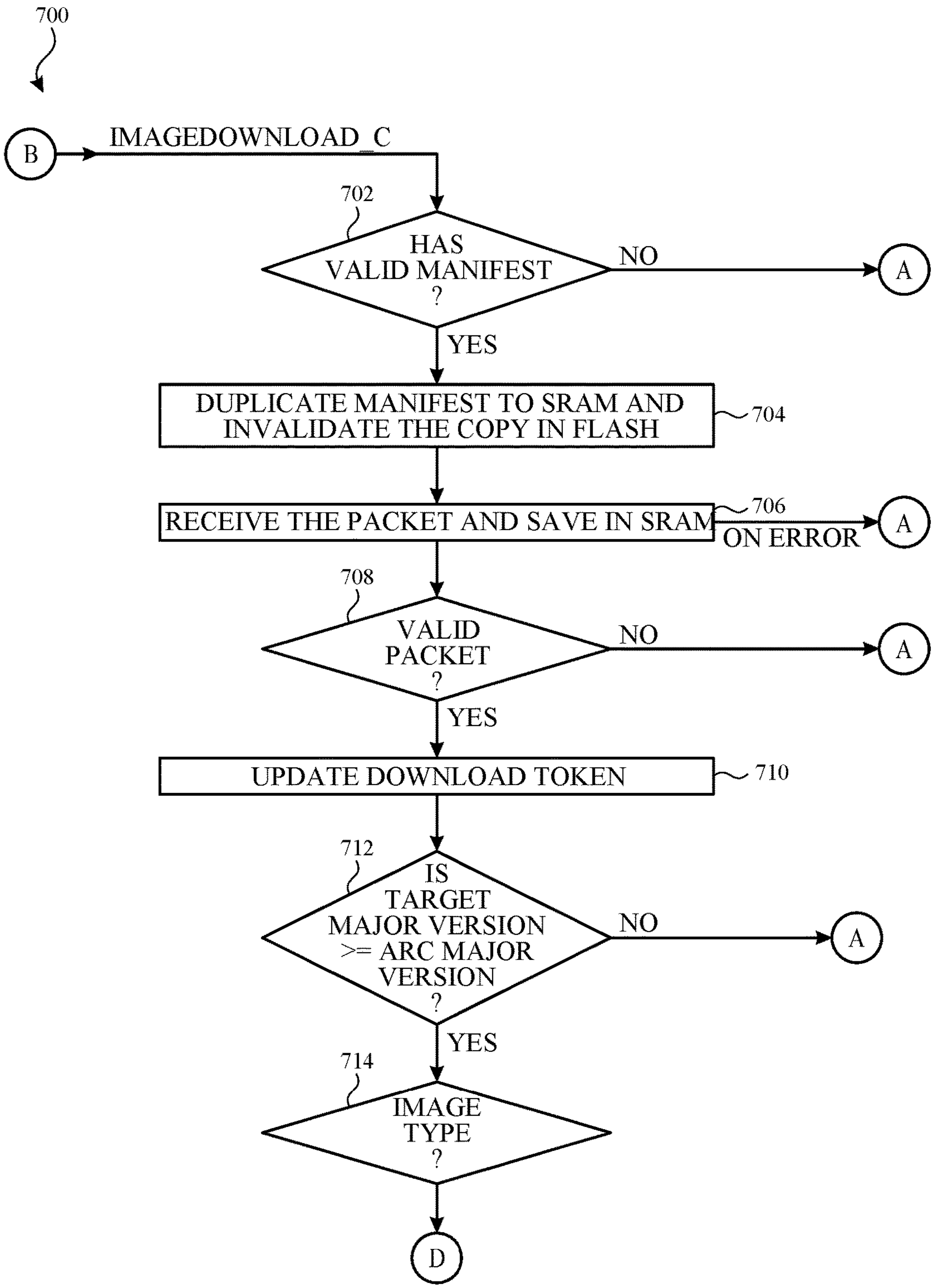
FIGS. 7A-7B illustrates a flow diagram of an example process for a secondary chip receiving a first packet of a software update from a primary chip in accordance with one or more implementations.
Figure 7B:
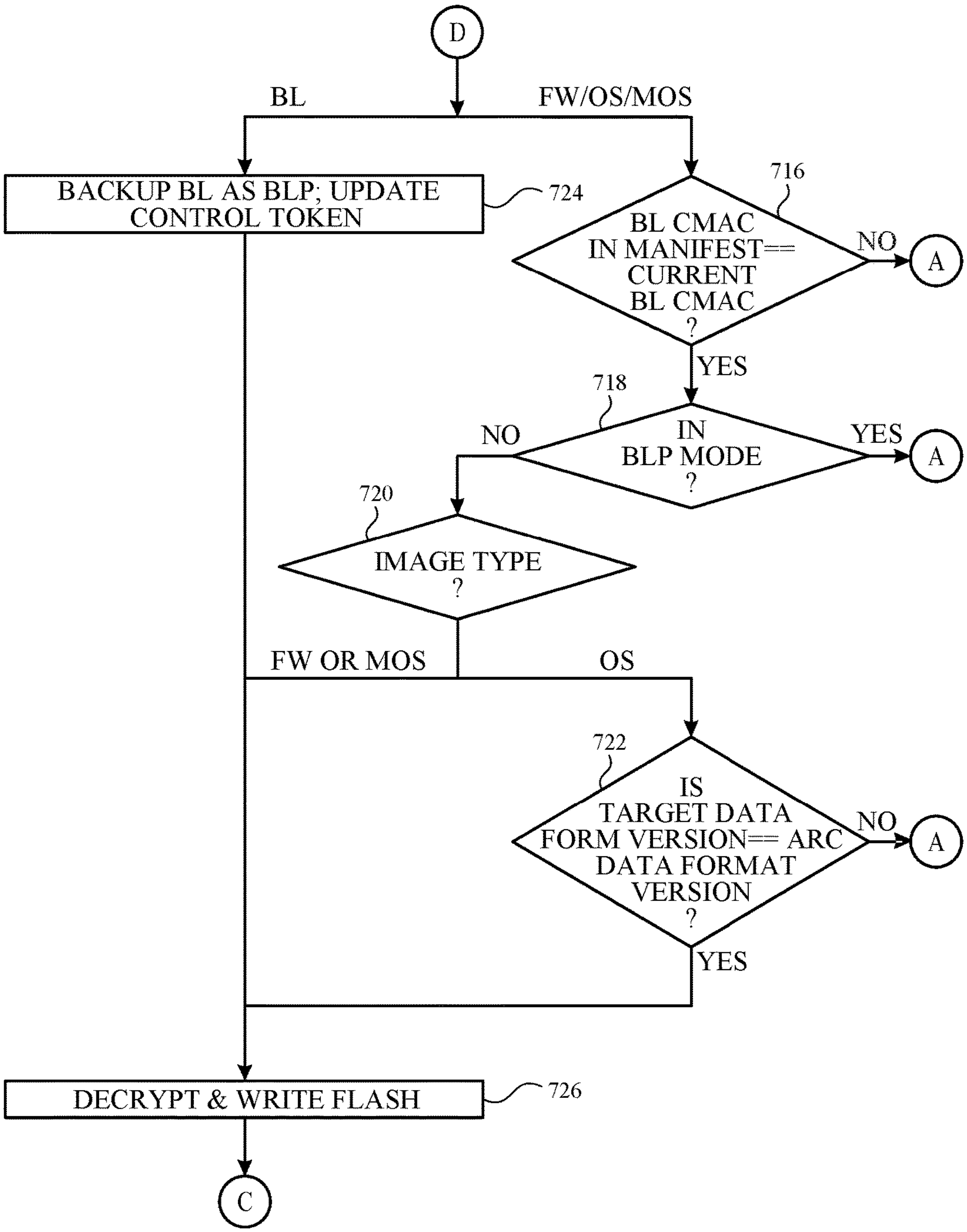

FIGS. 7A-7B illustrate a flow diagram of an example process 700 for a secondary chip receiving a first packet of a software update from a primary chip in a system for countersigning updates for multi-chip devices in accordance with one or more implementations. For explanatory purposes, the process 700 is primarily described herein with reference to the secure element 210 of the electronic device 102 of FIG. 2. However, the process 700 is not limited to the secure element 210 of the electronic device 102 of FIG. 2, and one or more blocks (or operations) of the process 700 may be performed by one or more other components or chips of the electronic device 102 and/or of the secure element 210. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The process 700 may be initiated when the secure element 210 receives the image download command in the process 600 of FIG. 6. Upon receiving the image download command, the secure element 210 verifies that a valid and verified manifest data item 300 is stored in the non-volatile memory 220 (702). If the secure element 210 determines that a valid and verified manifest data item 300 is not stored in the non-volatile memory 220 (702), the secure element 210 invalidates the manifest data item 300, sends an error response to the host processor 202 (618), and waits for a reset (616). If the secure element 210 determines that the valid and verified manifest data item 300 is stored in the non-volatile memory 220 (702), the secure element 210 copies the manifest data item 300 to the RAM 214 and invalidates the manifest data item 300 stored in the non-volatile memory 220 (704). The secure element 210 then receives a packet from the host processor 202 and stores the packet in the RAM 214 (706). If the packet is valid (706), the secure element 210 updates the download token (710) and confirms that the version of the software update being downloaded is greater than or equal to a current version of the software (712).

If an error occurs during the packet reception (706), the packet is invalid (708), and/or the version of the software update is lower than the current version (712), the secure element 210 invalidates the manifest data item 300, sends an error response to the host processor 202 (618), and waits for a reset (616). If the version of the software update being downloaded is greater than or equal to a current version (712), the secure element 210 determines the image type associated with the download (714).

In one or more implementations, the secure element 210 may utilize a preconfigured order for downloading and installing updates after receiving the manifest data item 300. For example, a bootloader update may be received first, followed by a firmware update, which may be followed by a migration OS update and/or an OS update. The migration OS may be a transient update that exists to update one or more libraries or code of the OS to a baseline level that allows for installing the OS update, when necessary. Thus, the migration OS may not be downloaded and/or installed in conjunction with every OS update. In one or more implementations, the firmware update may be received first, followed by a migration OS update and/or an OS update.

If the image type of the update corresponds to a bootloader update, the current bootloader is backed up into the bootloader programmer and the control token is updated (724). The control token may be created and/or updated by the bootloader and/or the bootloader programmer to indicate which bootloader should be loaded if the programming of the bootloader fails. In one or more implementations, the control token should point to one working bootloader under any circumstances. Thus, the secure element 210 may update the control token to reflect that the working current bootloader has been backed up into the bootloader programmer.

The secure element 210 may then decrypt the received packet and write the packet to the flash memory, such as the non-volatile memory 220 (726). In one or more implementations, the packet may be encrypted using asymmetric and/or symmetric encryption based on keys shared between the primary entity server 110 and the secure element 210, such that the host processor 202 is unable to decrypt and/or access the packets being transmitted.

If the image type is determined to be firmware (FW), migration OS (MOS), or OS (714), meaning the bootloader image, if any, has already been received, the secure element 210 confirms that the bootloader authentication code 315 of the received manifest data item 300 coincides with an authentication code locally generated from the received or current bootloader (716). If the bootloader authentication code 315 of the received manifest data item 300 coincides (716), the secure element confirms that it is not in the bootloader programmer mode (718). If the secure element 210 confirms that it is not in the bootloader programmer mode (718) and the image type is determined to correspond to firmware image or a migration OS image (720), the secure element 210 may then decrypt the received packet and write the packet to the flash memory, such as the non-volatile memory 220 (726).

If the image type is determined to correspond to an OS image (720), the secure element 210 confirms that the target data format version (of the OS to be updated) is the same as the source data format version (of the OS update) (722). If the secure element 210 confirms that the target data format version is the same as the source data format version (722), the secure element 210 decrypts the received packet and writes the packet to the flash memory, such as the non-volatile memory 220 (726). If the bootloader authentication code 315 does not coincide with the locally generated authentication code (716), if the secure element 210 is in the bootloader programmer mode (718), and/or if the target data format version is not the same as the source data format version (722), the secure element 210 invalidates the manifest data item 300, sends an error response to the host processor 202 (618), and waits for a reset (616).

After decrypting and writing to flash the first packet of any of the download images (726), the secure element 210 initiates the process discussed below with respect to FIG. 8.

Figure 8:
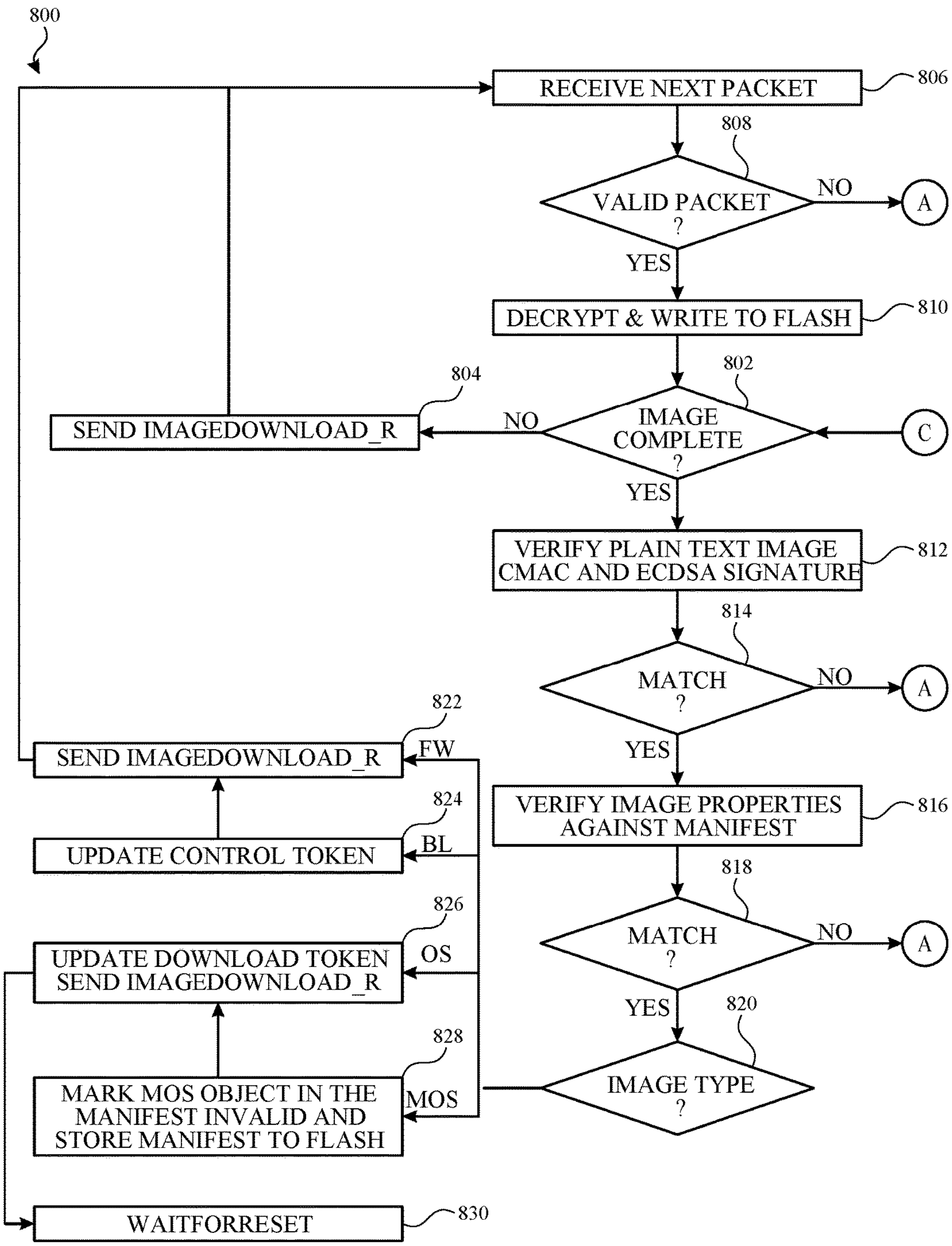
FIG. 8 illustrates a flow diagram of an example process for a secondary chip receiving remaining packets of a software update from a primary chip in accordance with one or more implementations.

FIG. 8 illustrates a flow diagram of an example process 800 for a secondary chip receiving remaining packets of a software update from a primary chip in a system for countersigning updates for multi-chip devices in accordance with one or more implementations. For explanatory purposes, the process 800 is primarily described herein with reference to the secure element 210 of the electronic device 102 of FIG. 2. However, the process 800 is not limited to the secure element 210 of the electronic device 102 of FIG. 2, and one or more blocks (or operations) of the process 800 may be performed by one or more other components or chips of the electronic device 102 and/or of the secure element 210. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

After decrypting and writing to flash the first packet of any of the download images at (726) of FIG. 7B, the secure element 210 determines whether the complete image has been received (802). If the complete image has not been received (802), the secure element 210 sends an image download request (804), and receives the next packet from the host processor 202 (806). The secure element 210 confirms that the packet is valid (808) and decrypts and writes the packet to flash, such as the non-volatile memory 220 (810).

The secure element 210 again determines if the image has been completely downloaded (802), and repeats (804)-(810) if the image has not been completely downloaded. If the secure element 210 determines that the image has been completely downloaded (802), the secure element 210 determines whether the authentication code received in the manifest data item 300 for the image matches an authentication code locally generated from the downloaded image, and the secure element 210 determines if the digital signature 320 of the manifest body 310 can be verified or authenticated using, e.g., the primary entity root public key 222 (812).

If the authentication code of the manifest data item 300 matches, and the digital signature can be verified (814), the secure element 210 verifies that one or more properties associated with the downloaded image coincide with one or more of the manifest properties 318 (816). For example, the downloaded image may include one or more properties, such as chip identifier, and the secure element 210 may confirm that the chip identifier matches the chip identifier of the manifest properties 318. If the properties of the downloaded image match the manifest properties 318 (818), the secure element 210 determines the image type for the downloaded image (820).

For a bootloader image, the secure element 210 updates the control token to point back to the bootloader rather than the bootloader programmer (824), and the secure element 210 sends an image download request (822). For a firmware image, the secure element 210 sends the image download request (822). For a migration OS image, the secure element 210 marks the migration OS object in the manifest data item 300, such as an object that includes the migration OS authentication code 314, as invalid and stores the updated manifest data item 300 in the non-volatile memory 220 (828). The secure element 210 updates the download token to reflect that the migration OS has been successfully downloaded, sends an image download request (826), and then waits for a reset (830). For the OS image, the secure element 210 updates the download token to reflect that the OS has been successfully downloaded, sends an image download request (826), and then waits for a reset (830). In one or more implementations, a reset may occur, and/or may be caused by the host processor 202, when the secure element 210 does not communicate with the host processor 202 for a predetermined amount of time.

If any of the received packets are invalid (808), if the authentication code of the manifest data item 300 does not match the locally generated authentication code (814), if the digital signature 320 of the manifest body 310 cannot be verified (814), and/or if the properties of the downloaded image do not match the manifest properties 318 (818), the secure element 210 invalidates the manifest data item 300, sends an error response to the host processor 202 (618), and waits for a reset (616).

FIG. 9 illustrates an example commands table 900 in a system for countersigning updates for multi-chip devices in accordance with one or more implementations. Not all of the depicted fields of the table 900 may be used in all implementations, however, and one or more implementations may include additional or different fields than those shown in the figure. Variations in the arrangement and type of the fields of the table 900 may be made without departing from the spirit or scope of the claims as set forth herein. Additional fields, different fields, or fewer fields may be provided.

The table 900 includes parameters for commands received by the secure element 210 from the host processor 202, such as a manifest query command (ManifestQuery_C), a manifest data command (ManifestData_C), and an image download command (ImageDownload_C).

When the secure element 210 receives the manifest query command (ManifestQuery_C) from the host processor 202, the secure element 210 may respond with a manifest query response message, such as a message that is formatted using the format discussed below with respect to FIG. 10. When the secure element 210 receives the manifest data command (ManifestData_C) that indicates that additional chunks of manifest data are available, the secure element 210 receives the chunks of the manifest data item from the host processor 202, and sends a manifest data response to the host processor 202. When the secure element 210 receives the manifest data command (ManifestData_C) that indicates that the command includes the last chunk of the manifest data item, the secure element 210 receives the last chunk, combines the received chunks, and evaluates the manifest data item. When the secure element 210 receives the image download command (ImageDownload_C), the secure element 210 initiates the process discussed above with respect to FIGS. 7A-7B to download the image.

FIG. 10 illustrates an example manifest query response message format 1000 in a system for countersigning updates for multi-chip devices in accordance with one or more implementations. Not all of the depicted fields of the manifest query response message format 1000 may be used in all implementations, however, and one or more implementations may include additional or different fields than those shown in the figure. Variations in the arrangement and type of the components of the manifest query response message format 1000 may be made without departing from the spirit or scope of the claims as set forth herein. Additional fields, different fields, or fewer fields may be provided.

The manifest query response message format 1000 illustrates an example message format that may be used by the secure element 210 to provide chip-specific information to the host processor 202 for further forwarding to the primary entity server 110, such as at operation (404) of FIG. 4 and/or at operation (606) of FIG. 6.

The manifest query response message format 1000 includes a protocol version field 1002, an image type field 1004, a configuration flag field 1006, a secure element identifier field 1008, a device nonce field 1010, a root public key identifier field 1012, a firmware image key identifier field 1014, an OS image key identifier field 1016, a bootloader version field 1018, a firmware version field 1020, an OS version field 1022, a migration OS version field 1024, a data format version field 1026, a chip identifier 1028, and a success/error code field 1030. The root public key identifier field 1012 may be used by the secure element 210 to identify the primary entity root public key 222 stored in the non-volatile memory 220, such as in implementations where the primary entity has multiple root private keys. In one or more implementations, the secure element 210 may not return the primary entity root public key 222 and may instead generate the root public key identifier as, for example, the SHA-256 (octet string encoded x coordinate||y coordinate) of the primary entity root public key 222.

Figure 11:
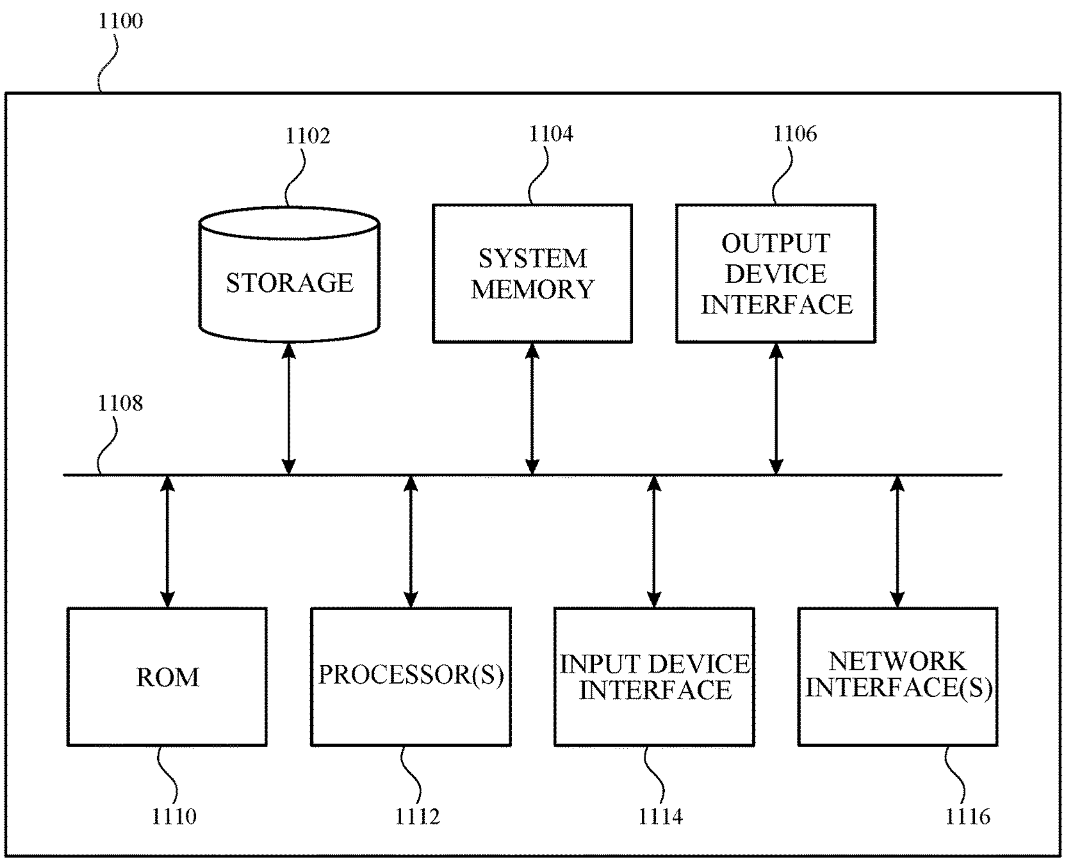
FIG. 11 illustrates an example electronic system with which aspects of the subject technology may be implemented in accordance with one or more implementations.

FIG. 11 illustrates an electronic system 1100 with which one or more implementations of the subject technology may be implemented. The electronic system 1100 can be, and/or can be a part of, the electronic device 102, and/or one or more of the servers 110, 120 shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110. From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes, such as the electronic device 102 shown in FIG. 1, through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system, comprising:

a memory configured to store a public key corresponding to a first entity associated with a collocated processor and a symmetric key corresponding to a second entity;

an interface that communicatively couples the system to the collocated processor;

at least one processor configured to:

receive, from the collocated processor over the interface, a software update associated with the second entity and a data item, the data item comprising a body and a digital signature associated with the body, the body of the data item comprising an authentication code associated with the software update;

verify the digital signature associated with the body of the data item based at least in part on the public key corresponding to the first entity;

verify the software update based at least in part on the authentication code and the symmetric key corresponding to the second entity; and install the software update when the digital signature and the software update are both verified, otherwise discard the software update.

2. The system of claim 1, wherein the software update comprises at least one of a bootloader update, a firmware update, or an operating system update.

3. The system of claim 1, wherein the memory is further configured to store an other symmetric key corresponding to a third entity associated with an other software update and the at least one processor is further configured to:

receive, from the collocated processor over the interface, the data item, the software update, and the other software update, the body of the data item further comprising an other authentication code generated using the other symmetric key corresponding to the third entity associated with the other software update.

4. The system of claim 3, wherein the at least one processor is further configured to:

verify the other software update based at least in part on the other authentication code and the other symmetric key corresponding to the third entity; and install the other software update when both the data item and the other software update are verified, otherwise discard the other software update.

5. The system of claim 1, wherein the data item further comprises an other public key corresponding to the first entity, and an other digital signature associated with the other public key, and the at least one processor is further configured to:

verify the other digital signature using the public key; and verify the digital signature using the other public key.

6. The system of claim 1, wherein the at least one processor is configured to:

prior to receiving the data item and the software update, receive, from the collocated processor over the interface, a query for chip-specific information;

provide, to the collocated processor over the interface, the chip-specific information and a first nonce value; and store the first nonce value in the memory.

7. The system of claim 6, wherein data item comprises a second nonce value and an other chip-specific information, the at least one processor is further configured to:

verify that the first nonce value equals the second nonce value;

invalidate the first nonce value; and verify that the other chip-specific information matches at least some of the chip-specific information.

8. The system of claim 1, wherein the first entity comprises a first manufacturer associated with the collocated processor and the second entity comprises a second manufacturer associated with the software update.

9. The system of claim 1, wherein the collocated processor comprises a host processor and the system comprises a secure element.

10. The system of claim 1, wherein the public key and the symmetric key are stored in the memory when the system is manufactured.

11. The system of claim 1, wherein the interface comprises a single wire protocol interface.

12. A method comprising:

receiving, from a collocated chip, a data item and a software update, the data item being signed using a private key corresponding to a primary entity associated with the collocated chip and the data item comprising an authentication code generated using a symmetric key corresponding to a secondary entity associated with the software update;

verifying the data item using a public key associated with the primary entity;

verifying the software update based at least in part on the authentication code and using the symmetric key corresponding to the secondary entity; and installing the software update when both the data item and the software update are verified, otherwise discarding the software update.

13. The method of claim 12, wherein the software update comprises at least one of a bootloader update, a firmware update, or an operating system update.

14. The method of claim 12, further comprising:

receiving, from the collocated chip, the data item, the software update, and an other software update, wherein the data item comprises an other authentication code generated using an other symmetric key corresponding to an other secondary entity associated with the other software update;

verifying the other software update based at least in part on the other authentication code and using the other symmetric key corresponding to the other secondary entity; and installing the other software update when both the data item and the other software update are verified, otherwise discard the other software update.

15. The method of claim 12, wherein the primary entity comprises a first manufacturer associated with the collocated chip and the secondary entity comprises a second manufacturer associated with the software update.

16. A device, comprising:

at least one processor configured to:

receive, from a collocated chip, a data item and a software update, the data item being signed using a private key corresponding to a manufacturer associated with the collocated chip and the data item comprising an authentication code generated using a symmetric key corresponding to an entity that generated the software update;

verify the data item using a public key associated with the manufacturer associated with the collocated chip;

verify the software update based at least in part on the authentication code and using the symmetric key corresponding to the entity that generated the software update; and install the software update when both the data item and the software update are verified, otherwise discard the software update.

17. The device of claim 16, wherein the software update comprises at least one of a bootloader update, a firmware update, or an operating system update.

18. The device of claim 16, wherein the at least one processor is further configured to:

receive, from the collocated chip, the data item, the software update, and an other software update, wherein the data item comprises an other authentication code generated using an other symmetric key corresponding to an other entity that generated the other software update;

verify the other software update based at least in part on the other authentication code and using the other symmetric key corresponding to the other entity; and install the other software update when both the data item and the other software update are verified, otherwise discard the other software update.

19. The device of claim 16, wherein the collocated chip comprises a host processor and the device comprises a secure element.

20. The device of claim 19, further comprising:

a single wire protocol interface that communicatively couples the device to the collocated chip.

* * * * *